(12) United States Patent
Hansson et al.

(10) Patent No.: US 7,149,510 B2
(45) Date of Patent: Dec. 12, 2006

(54) SECURITY ACCESS MANAGER IN MIDDLEWARE

(75) Inventors: Jonas Hansson, Lund (SE); Björn Bjäre, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 271 days.

(21) Appl. No.: 10/666,673

(22) Filed: Sep. 19, 2003

(65) Prior Publication Data

US 2004/0127190 A1    Jul. 1, 2004

Related U.S. Application Data

(60) Provisional application No. 60/412,844, filed on Sep. 23, 2002, provisional application No. 60/412,756, filed on Sep. 23, 2002.

(51) Int. Cl.
*H04M 3/00* (2006.01)

(52) U.S. Cl. .................. 455/418; 455/403; 709/203; 719/328

(58) Field of Classification Search ............... 455/418; 709/203; 719/328
See application file for complete search history.

(56) References Cited

U.S. PATENT DOCUMENTS

| | | | |
|---|---|---|---|
| 3,831,148 A | 8/1974 | Greenwald et al. |
| 5,689,565 A | 11/1997 | Spies et al. |
| 5,771,240 A | 6/1998 | Tobin et al. |
| 5,937,366 A | 8/1999 | Zbytniewski et al. |
| 6,002,869 A | 12/1999 | Hinckley |
| 6,044,408 A | 3/2000 | Engstrom et al. |
| 6,049,896 A | 4/2000 | Frank et al. |
| 6,052,524 A | 4/2000 | Pauna |
| 6,061,709 A | 5/2000 | Bronte |
| 6,105,154 A | 8/2000 | Wang et al. |
| 6,112,312 A | 8/2000 | Parker et al. |
| 6,137,802 A | 10/2000 | Jones et al. |
| 6,269,396 B1 | 7/2001 | Shah et al. |

(Continued)

FOREIGN PATENT DOCUMENTS

EP    0902596 A2    3/1999

(Continued)

OTHER PUBLICATIONS

U.S. Appl. No. 10/606,684.

(Continued)

*Primary Examiner*—George Eng
*Assistant Examiner*—Phuoc Doan

(57) ABSTRACT

Method and system for controlling access to a platform for a mobile terminal for a wireless telecommunications system or for another product. The system includes a platform having a software services component and an interface component having at least one interface for providing access to the software services component for enabling application domain software to be installed, loaded, and run in the platform. An access controller controls access to the software services component by the application domain software via the at least one interface. The access controller includes an interception module for receiving a request from the application domain software to access the software services component, and a security access manager for determining if the permission request should be granted. The application domain software is granted access to the software services component via the at least one interface if the permission request is granted by the security access manager.

17 Claims, 9 Drawing Sheets

U.S. PATENT DOCUMENTS

| | | | |
|---|---|---|---|
| 6,279,124 | B1 | 8/2001 | Brouwer et al. |
| 6,317,659 | B1 | 11/2001 | Lindsley et al. |
| 6,353,897 | B1 | 3/2002 | Nock et al. |
| 6,389,491 | B1 | 5/2002 | Jacobson et al. |
| 2001/0015654 | A1 | 8/2001 | Habarsetzer et al. |
| 2002/0029378 | A1 | 3/2002 | Larsson |
| 2002/0069065 | A1 | 6/2002 | Schmid et al. |
| 2002/0099837 | A1 | 7/2002 | Naoyuki et al. |
| 2003/0145044 | A1* | 7/2003 | Raivisto et al. ............. 709/203 |
| 2004/0216147 | A1* | 10/2004 | Yanosy et al. .............. 719/328 |

FOREIGN PATENT DOCUMENTS

| | | |
|---|---|---|
| EP | 1074911 A2 | 2/2001 |
| EP | 1 136 912 A2 | 9/2001 |
| EP | 1241905 A1 | 9/2002 |
| WO | WO 97/16938 | 5/1997 |
| WO | WO 98/19239 | 5/1998 |
| WO | WO 99/49394 | 9/1999 |
| WO | WO 00/08611 | 2/2000 |
| WO | WO 00/69084 | 11/2000 |
| WO | WO 00/72586 A2 | 11/2000 |
| WO | WO 01/14960 A2 | 3/2001 |
| WO | WO 01/41393 A2 | 6/2001 |
| WO | WO 01/50282 A1 | 7/2001 |
| WO | WO 01/51940 A1 | 7/2001 |
| WO | WO 01/88707 A2 | 11/2001 |
| WO | WO 02/27565 | 4/2002 |
| WO | WO 02/29824 | 4/2002 |
| WO | WO 02/33879 A2 | 4/2002 |
| WO | WO 02/35351 A1 | 5/2002 |
| WO | WO 02/054094 | 7/2002 |
| WO | WO 02/056172 A | 7/2002 |

OTHER PUBLICATIONS

Don Batory et al., "The Design and Implementation of Hierarchical Software Systems with Reusable Components" ACM Transactions on Software Engineering and Methodology, Association for Computing Machinery, New York, US, vol. 1, No. 4, Oct. 1, 1992, pp. 355-398.

Gabriele Goldacker et al., "Broadband-ISDN standardization—State of the art", Computer Standards and Interfaces, Elsevier Sequoia, Lausanne, CH, vol. 17, No. 1, 1995, pp. 55-62.

U.S. Appl. No. 10/359,911.
U.S. Appl. No. 10/359,772.
U.S. Appl. No. 10/359,835.
U.S. Appl. No. 10/666,699.
U.S. Appl. No. 10/664,618.
U.S. Appl. No. 10/665,834.

Manuel Rodriguez-Martinez et al., "Automatic Deployment of Application-Specific Metadata and Code in MOCHA", Lecture Notes in Computer Science, Mar. 31, 2000 (pp. 69-85).

N.J. Drew et al., "Reconfigurable Mobile Communications: Compelling Needs and Technologies to Support Reconfigurable Terminals", IEEE International Symposium on Personal, Indoor and Mobile Radio Communications, PIMRC. Wireless: Merging onto the Information Superhighway, vol. 1, Sep. 18, 2000 (pp. 484-489).

Aspects & Crosscutting in Layered Middleware Systems by Lodewlik M.J. Bergmans et al.; Trese Group-Center for Telematics and Information Technology (CTIT); pp. 1-3.

Supporting the Design of Adaptable Operating Systems Using Aspect-Oriented Frameworks by Paniti Netinant et al.; International Conference on Parallel and Distributed Processing Techniques and Applications (PDPTA 2000); Las Vegas, Nevada; Jun. 26-29, 2000; 7 Pages.

A Layered Approach to Building Open Aspect-Oriented Systems by Paniti netinant et al.; Communications of the AC; Oct. 2001; vol. 44, No. 10; pp. 83-85.

Aspect-Oriented Programming by Silvia Breu; pp. 1-22.

Draft: Aspect-Design in the Building-Block Method by Jurgen K. Muller; Philips Research Laboratories; International Workshop on Aspect-Oriented Programming at ECOOP, 1992; 3 Pages.

A Version Model for Aspect Dependency Management by Elke Pulvermuller et al.; J. Bosh (Ed.): GCSE 2001, LNCS 2186, Springer-Verlag Berlin Heidelberg 2001, pp. 70-79.

Can AOP Support Extensibility In Client-Serer Architectures? by Yvonne Coady et al.; European Conference on Object-Oriented Programming (ECOOP); Aspect-Oriented Workshop, Jun. 2001; pp. 1-4.

Mapping Requirements to Architecture: an Experience Report from the VIVIAN Project by Titos Saridakis; Proceedings of the 14th International Conference on Software and Systems Engineering and their Applications, Dec. 2001; pp. 1-6.

Functionality Needed in Middleware for Future Mobile Computing Platforms by Kimmo Raatikainen; Middleware for Mobile Computing Workshop held at IFIP/ACM Middleware Conference, Heidelberg, Germany, 2001; 10 Pages.

Design and Implementation of Java Application Environment and Software Platform for Mobile Phones, by Kazutoshi Usui, Hiroyuki Tomimori, Junji Takagi, Tomohisa Tanaka and Yukikazu Nakamoto; XP-001092568; Special Issue on IMT2000 Mobile Communication System; Oct. 2001; pp. 379-383.

Container-Managed Messaging: An Architecture for Integrating Java Components and Message-Oriented Applications by Ignacio Silva-Lepe, Christopher Codella, Peter Niblett, Donald Ferguson, Proceedings of the 37th International Conference on Technology of Object-Oriented Languages and Systems (Tools-Pacific 2000), Sydney, NSW, Australia, Nov. 20-23, 2000; pp. 228-241.

K. Moessner, et al., "Terminal Reconfigureability—The Optima Framework" 3G Mobile Communication Technologies, No. 477, XP002266662, Mar. 26-28, 2001, (pp. 241-246).

K. Moessner, et al., "Terminal Reconfigureability—The Software Download Aspect", 3G Mobile Communication Technologies, Conference Publication, No. 471, XP002266663, (pp. 326-330).

Downs D, et al; "Issues in discretionary access control," Proceedings of the Symposium on Security and Privacy, Oakland, CA, Apr. 22-24, 1985, Silver Spring, IEEE Computer Society, US, vol. SYMP. 6, 1985, pp. 208-218.

International Search Report for PCT/EP03/10496, European Patent Office, Aug. 5, 2005.

* cited by examiner

SECURITY ACCESS MANAGER IN MIDDLEWARE

CROSS REFERENCE TO RELATED APPLICATIONS

This application claims the benefit of priority from and incorporates by reference the entire disclosure of U.S. Provisional Patent Application No. 60/412,844, filed on Sep. 23, 2002. This application claims the benefit of priority from and incorporates by reference the entire disclosure of U.S. Provisional Patent Application No. 60/412,756, filed on Sep. 23, 2002. This patent application incorporates by reference the entire disclosure of U.S. patent application Ser. No. 10/359,772, which was filed on Feb. 7, 2003. This patent application incorporates by reference the entire disclosure of U.S. patent application Ser. No. 10/359,835, which was filed on Feb. 7, 2003. This patent application incorporates by reference the entire disclosure of U.S. patent application Ser. No. 10/359,911, which was filed on Feb. 7, 2003.

BACKGROUND OF THE INVENTION

1. Technical Field of the Invention

The present invention relates generally to the field of wireless telecommunications; and, more particularly, to a system and method for controlling access to a platform for a mobile terminal for a wireless telecommunications system.

2. Description of Related Art

Since cellular telecommunications systems were first introduced in the 1980s, mobile terminals (Mobile Stations) utilized in the systems have become increasingly more complex. Initially, mobile terminals were designed primarily to provide voice telephony services; i.e., to receive and transmit voice communications. In later years, mobile terminals were developed that also included the ability to transfer user data not related to that of a voice telephone call. Such user data included, for example, data to be transferred over a dial-up networking connection initiated via a personal computer (PC).

Currently, so-called "third generation" (3G) systems are being developed for future mobile telecommunications systems. 3G systems will combine high-speed Internet access with traditional voice communication, and will provide a user with access to Internet browsing, streaming audio/video, positioning, video conferencing and many other capabilities in addition to voice communication.

The Third Generation Partnership Project (3GPP) was established to ensure compatibility among the several 3G systems that are being developed around the world. The Universal Mobile Telephone System (UMTS) is being developed by 3GPP to provide a 3G system that includes terrestrial and satellite systems capable of delivering voice, data and multimedia anywhere in the world.

The drastically increased functionality that is being included in cellular telecommunications systems via the 3GPP standardization has placed substantial demands on the developers of mobile terminals to be used in the systems. This demand is exacerbated by the fact that a mobile terminal is a "resource scarce" environment that is limited in size, memory and power.

Traditionally, mobile terminal manufacturers have designed, fabricated and marketed substantially complete mobile terminal systems that include all the hardware and software needed for basic terminal operation as well as the hardware and software needed to provide the features and capabilities desired by the manufacturer or a particular user based on their perception of market needs. Such an approach does not provide the flexibility to quickly adapt to rapid changes in market demands or to satisfy the diverse requirements of multiple users.

Recognizing the inadequacies of traditional procedures for designing and fabricating mobile terminals, a mobile terminal platform assembly has been developed that includes a plurality of functionally complementary units of software and hardware that can be marketed as a unit to a plurality of users. Each user can then install, load, and run his own application software into the assembly to provide a tailored platform system for a mobile terminal that meets the user's own particular needs. The mobile terminal platform assembly and the platform system are described in detail in commonly assigned U.S. patent application Ser. Nos. 10/359,911 and 10/359,835, the disclosures of which are hereby incorporated by reference.

A platform system such as described above, wherein mobile terminal platform assembly software and application software are developed separately and then later combined by installing, loading, and running the application software in the mobile terminal platform assembly, may require a non-native application such as a Java midlet to run on a virtual machine. The virtual machine guarantees that, for example, no illegal memory access will take place. However, such non-native applications depend on functionality that is provided by the native code of the mobile terminal platform assembly. Unrestricted access to such native functionality in, for example, the platform domain or the application domain, may jeopardize the integrity of the mobile terminal by, e.g., initiating cost incurring events without notifying the end user.

Certificates of origin are used on applications to determine the extent of trust therein and therefore grant access to a subset of the services made available by the mobile terminal platform assembly to the non-native execution environment. However, the situation is further complicated by the fact that the permissions granted might be changed in run-time by the end user of the mobile terminal.

Therefore, there is a need for a dynamic registration of the permissions as well as dynamic filtering of the access to the native code of the mobile terminal platform assembly at any time (e.g., run time).

SUMMARY OF THE INVENTION

A system for controlling access to a platform includes a platform having a software services component and an interface component. The interface component has at least one interface for providing access to the software services component for enabling application domain software to be installed, loaded, and run in the platform. The system also includes an access controller for controlling access to the software services component by a requesting application domain software via the at least one interface. The access controller includes an interception module for receiving a request from the requesting application domain software to access the software services component and a decision entity for determining if the request should be granted. The requesting application domain software is granted access to the software services component via the at least one interface if the request is granted.

A method of controlling access to a platform having a software services component and an interface component includes receiving a request from a requesting application domain software to access the software services component. The interface component has at least one interface for providing access to the software services component for enabling application domain software to be installed, loaded, and run on the platform. The method also includes determining if the request should be granted and, if the request is granted, granting access to the requested software services component via the at least one interface.

A system for controlling access to a platform for a mobile terminal for a wireless telecommunications system includes a platform having a software services component and an interface component. The interface component has at least one interface for providing access to the software services component for enabling non-native application software to be installed, loaded, and run on the platform. The system also includes an access controller for controlling access to the software services component by the non-native application software via the at least one interface. The access controller includes an interception module for receiving a request from the non-native application software to access the software services component and a decision entity for determining if the request should be granted. The non-native application software is granted access to the software services component via the at least one interface if the request is granted.

DETAILED DESCRIPTION OF THE EXEMPLARY EMBODIMENTS OF THE INVENTION

Figure 1:
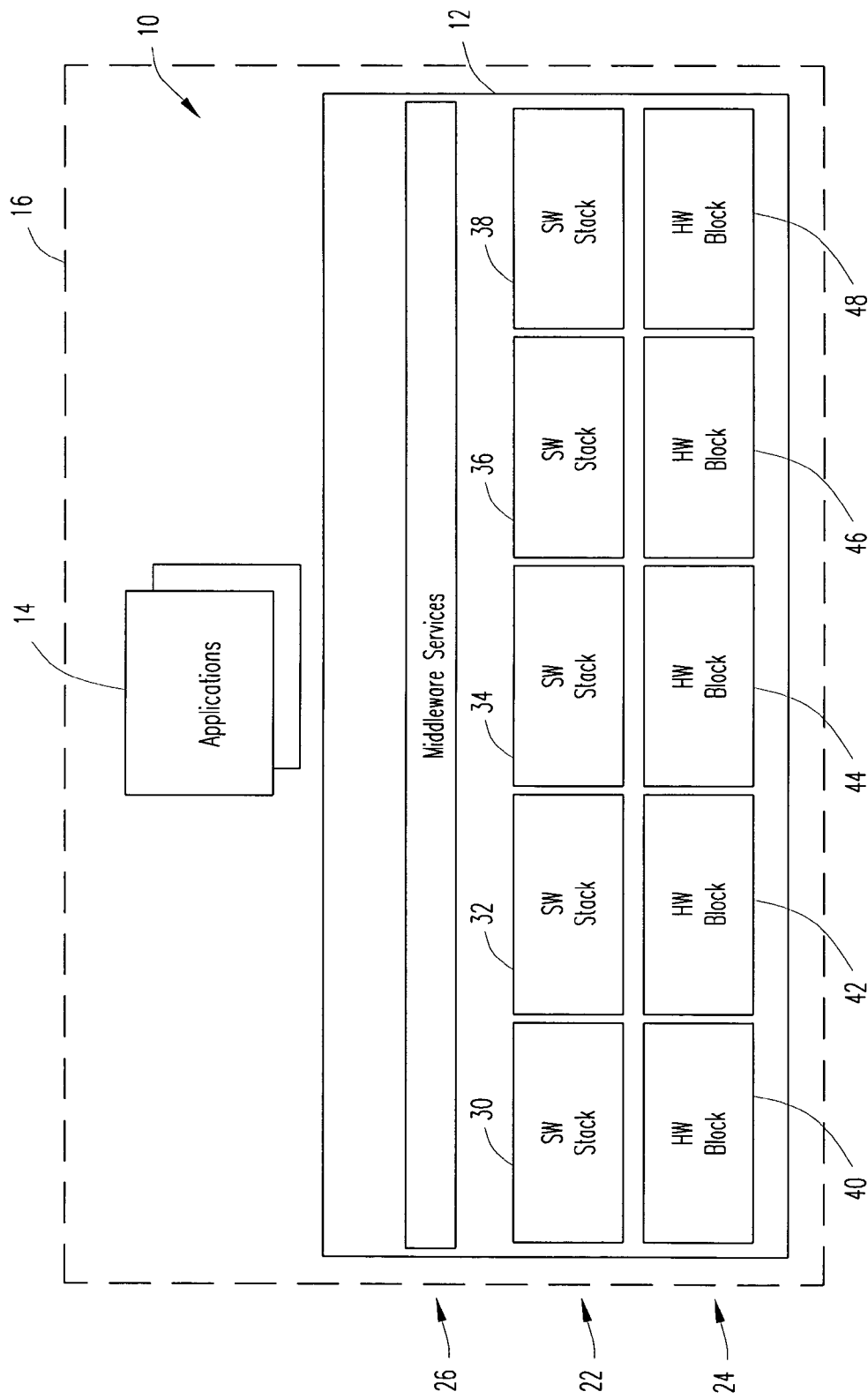
FIG. 1 is a block diagram that schematically illustrates a platform system for a mobile terminal for a wireless telecommunications system to assist in explaining principles of the present invention.

FIG. 1 is a block diagram that schematically illustrates a platform system for a mobile terminal for a wireless telecommunications system to assist in explaining principles of the present invention. The platform system is generally designated by reference number 10 and includes a mobile terminal platform assembly 12 and one or more applications (i.e., application software) 14 that have been installed, loaded, and run in the mobile terminal platform assembly 12. Platform system 10 is adapted to be incorporated in a mobile terminal generally designated by dotted line 16.

Mobile terminal platform assembly 12 includes a software services component 22, a hardware component 24, and an interface component 26. Software services component 22 includes a plurality of well-structured functional software units for providing services that are offered to users via the interface component 26. In the exemplary system 10 illustrated in FIG. 1, the plurality of software units include a plurality of vertically-oriented functional software stacks 30–38. The hardware component 24 includes a set of hardware units that are associated with and controlled by their respective functional software stacks 30–38. In the exemplary system 10 illustrated in FIG. 1, the hardware units are different hardware blocks 40–48 associated with the software stacks 30–38.

The interface component 26 includes a middleware services layer that includes at least one application programming interface (API) for installing, loading, and running one or more applications 14 in mobile terminal platform assembly 12, that isolates the mobile terminal platform assembly 12 from the applications 14 using the assembly 12 via the interfaces, and that provides various other services for the applications 14. Specific details of the middleware services layer will be described hereinafter.

Mobile terminal platform assembly 12 of platform system 10 is adapted to be designed, implemented, assembled, and tested as a complete, enclosed unit separate from the application software 14 (the term "application software" as used herein can be any software that provides the functionality that users (e.g., manufacturers or end users) may wish to have available in addition to the platform software functionality). Users can, accordingly, develop or otherwise acquire their own application software 14 and add that software 14 to the mobile terminal platform assembly 12 at a later time in order to tailor the platform system 10 to their needs. Mobile terminal platform assembly 12 can, accordingly, be sold or otherwise transferred to a plurality of different users each of which can tailor the platform system 10 by installing, loading, and running their own application software on the assembly in order to satisfy their own particular requirements for the platform system.

Figure 2:
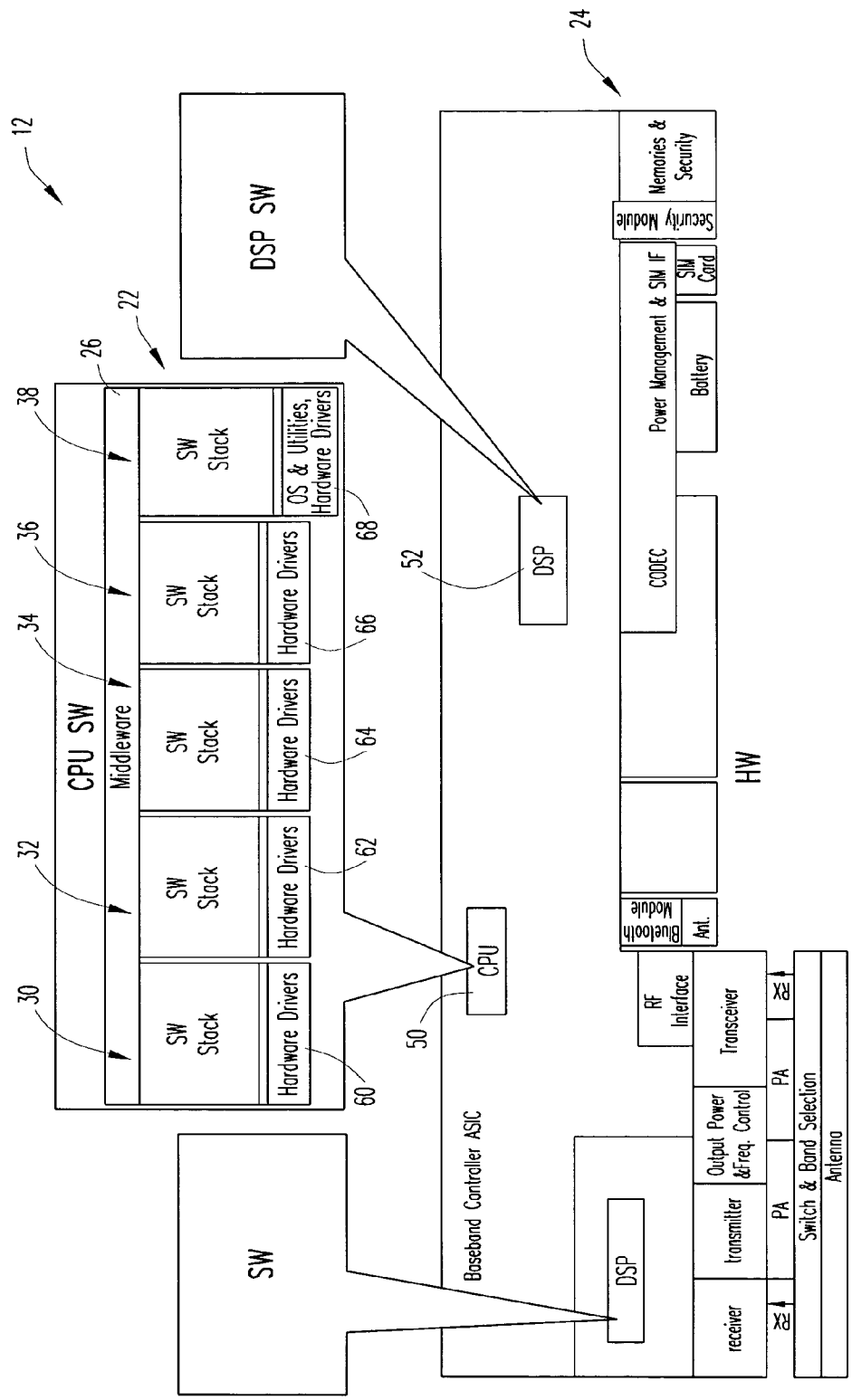
FIG. 2 is a block diagram that schematically illustrates a deployment view of the mobile terminal platform assembly of the platform system of FIG. 1 to further assist in explaining principles of the present invention.

FIG. 2 is a block diagram that schematically illustrates one example of a deployment view of mobile terminal platform system 12 of FIG. 1 to further assist in understanding the present invention. As illustrated in FIG. 2, mobile terminal platform assembly 12 is controlled via software executing in a main CPU 50. The main CPU 50 may include one or more processors such as microprocessors, micro programmable processors or DSPs (Digital Signal Processors). The software stacks 30–38 of software component 22 each include hardware driver software 60–68 to operate the hardware units associated with each stack. Further details of the mobile terminal platform assembly 12 and platform system 10 are given in the above-mentioned commonly assigned U.S. patent application Ser. No. 10/359,835. The software incorporated in mobile terminal platform assembly 12 is preferably arranged in such a manner as to make the software organization easy to understand so that it can be more easily designed and more easily upgraded or otherwise modified.

Figure 3:
FIG. 3 is a block diagram that schematically illustrates the software architecture of the mobile terminal platform assembly of FIGS. 1 and 2 to further assist in explaining principles of the present invention.

FIG. 3 is a block diagram that schematically illustrates the software architecture of mobile terminal platform assembly 12 to further assist in explaining principles of the present invention. As shown in FIG. 3, software services component 22, in addition to being organized into a plurality of vertical functional software stacks 30–38 as described above, is also arranged to define a plurality of horizontal layers such that the software of the middleware services layer and the software of the software services component 22 together define a layered architecture, generally designated by reference number 70, in which the layers are arranged in descending order from a higher level service layer to a lower level service layer.

The software architecture differs from the standard ISO/OSI (ISO Open Systems Interconnection) model in that it includes a plurality of horizontally partitioned functional software units that complement a plurality of vertically partitioned software layers. The horizontal partitioning contributes significantly to the creation of independent modular components.

The highest layer of the layered architecture is the middleware services layer. The layers of the software services component 22 include an application server layer 80 to provide application services, a platform services layer 82 to provide platform specific services for applications, a platform protocol layer 84 to provide session protocols and application specific protocols, a transport layer 86 to provide audio access/control, datacom transport protocols, messaging transport protocols and the like, a data access layer 88 to provide external data IF access, structured storage services and other low level platform support services, a logical drivers layer 90 and a physical drivers layer 92 encapsulating hardware dependencies. In addition, software services component 22 includes basic system services layers 94 that provide general services that are needed by the platform assembly.

The bottom two layers 90 and 92 constitute Hardware Abstraction Layers (HAL) which isolate the dependencies between the software and the hardware. Only the physical drivers layer is concerned with the details of the hardware (e.g., which registers in the ASIC hardware are addressed). The logical drivers layer 90 provides a logical mapping to the hardware, i.e., this layer provides a bridge between the hardware and software parts of the mobile terminal platform assembly.

The software itself is organized into a plurality of software modules, modules 102, 104, 106 being specifically shown in FIG. 3. In software services component 22, a single module can reside in only one vertical functional stack and in only one horizontal layer within that stack. Each layer can contain from one to many modules, and all the modules in a particular layer in a particular stack have the same level of abstraction. Communication among the various modules is accomplished via a Software Back Plane (SwBP) 112 subject to a set of basic rules for software module-to-module access. These rules can be summarized as follows:

A software module may invoke functionality in all layer interfaces below its own layer.

There are no limitations for the direction of serialized data flows. They may go in any direction.

A software module may never invoke functionality in layer interfaces (in the SwBP 112) above its own layer, independent of which module the layers belong.

A software module may invoke functionality in the layer interface in its own layer in the same vertical stack.

A software module may invoke functionality in a software module in the same layer in another vertical stack. (This capability is permitted to limit the number of layers in the vertical stacks.)

There is no hard coupling between the various modules and the interfaces in the SwBP 112. As a result, the modules and/or the implementation of the interfaces can be freely changed without any impact on clients to the interfaces. A client is, for example, an application, utility, plug-in, or any other consumer of platform services. This absence of hard coupling is an important capability as it permits individual modules to be added, removed or changed without affecting other modules in the platform assembly.

Further details of the layered architecture, including the SwBP software structure that enables the internal communication between modules within the mobile terminal platform assembly are described in the above-mentioned commonly assigned, U.S. patent application Ser. No. 10/359, 911. The middleware services layer functions to provide a well-defined interface between the software in the mobile terminal platform assembly 12 and the application software 14 to be installed, loaded, and run in the platform assembly, and encapsulates the mobile terminal platform assembly 12 and isolates the assembly 12 from applications via the middleware services layer, and provides various other services for the applications.

Figure 4A:
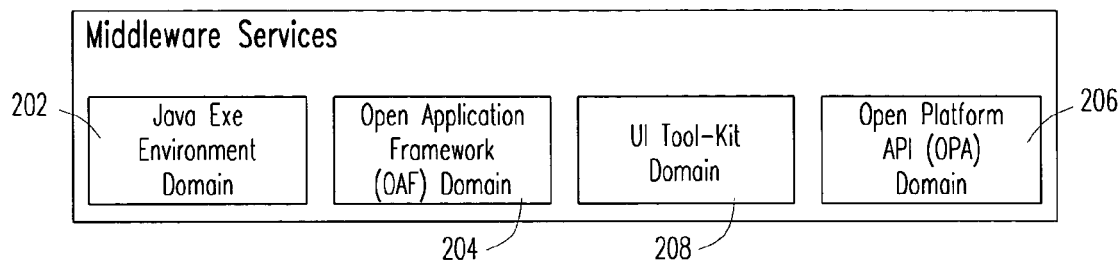
FIG. 4A is a logical block diagram that schematically illustrates details of the middleware services layer of FIGS. 1–3 according to an exemplary embodiment of the present invention.

FIG. 4A is a block diagram that schematically illustrates details of the middleware services layer of the interface component 26 in accordance with principles of the invention. As shown in FIG. 4A, the middleware services layer includes a plurality of API domains, including a non-native environment (e.g., a Java Execution (Java ExE) Environment) API domain 202, an Open Application Framework (OAF) API domain 204, an Open Platform API (OPA) domain 206, and a UI Tool-kit API domain 208.

Through the APIs 202–208 in the middleware services layer, the mobile terminal platform assembly 12 supports a plurality of application environments. In the exemplary embodiment of FIG. 4A, the middleware services layer supports environments for native applications (i.e., applications that are compiled to run with a particular processor and its set of instructions) and for non-native applications (e.g., Java J2ME CLDC/MIDP (Java 2 Micro Edition Connected Limited Device Configuration/Mobile Information Device Profile)). Each application environment has its own characteristics and in terms of:

The way applications are developed (programming language support, compilation and linkage).

The way applications are executed (e.g., interpretation or native code execution)

The functional services that are offered.

Potential restrictions in use.

By providing multiple application environment alternatives, a wide range of products with varying demands such as cost, ease of use, time to market, functionality set, size, portability, etc. is facilitated.

Figure 4B:
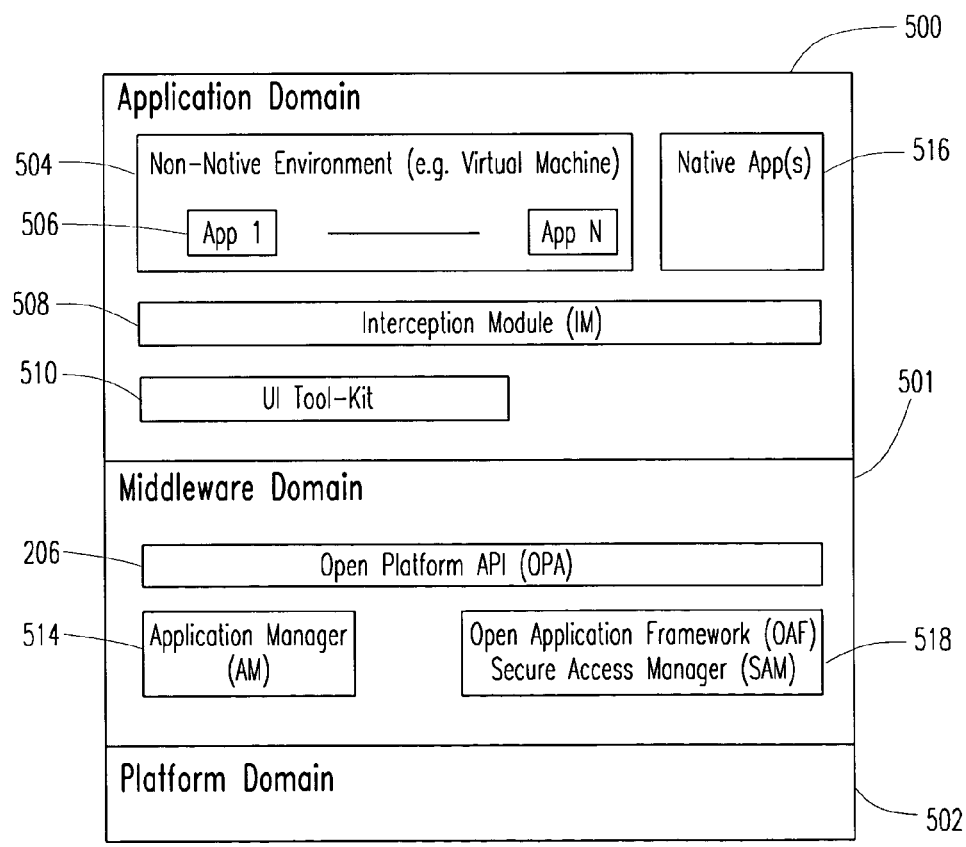
FIG. 4B is an implementation view that illustrates relationships between different parts of the system, i.e. the Application Domain 500, the Middleware Domain 501 and the Platform Domain 502.

FIG. 4B illustrates relationships between different parts of the system via an implementation view. The main domains are the Application Domain 500, the Middleware Domain 501, and the Platform Domain 502. Modules on a higher level are considered to have dependencies on lower-level modules in FIG. 4B. The Application Domain 500 may hold non-native applications 506(1)–(N) encapsulated in a non-native environment 504 (e.g., a Java virtual machine) as well as native applications 516. However, the Application Domain 500 need not necessarily hold any non-native applications. Service requests from the applications 506 and 516 are subject to access control via an Interception Module 508 before they are passed on to lower-level services. Such lower-level services may include Plug-Ins (e.g., a UI Toolkit 510) holding high-level graphical support as well as more fundamental services represented by an Open Platform API (OPA) 512 in the Middleware Domain 501. Via OPA 512, applications may communicate with an Application Manager (AM) 514 in order to request updates of access permissions. In an exemplary embodiment, the AM 514 informs a security access manager (SAM) 518 of any such requests. Further details of the middleware service layer component 26 are described in commonly assigned U.S. patent application Ser. No. 10/359,772.

Figure 5:
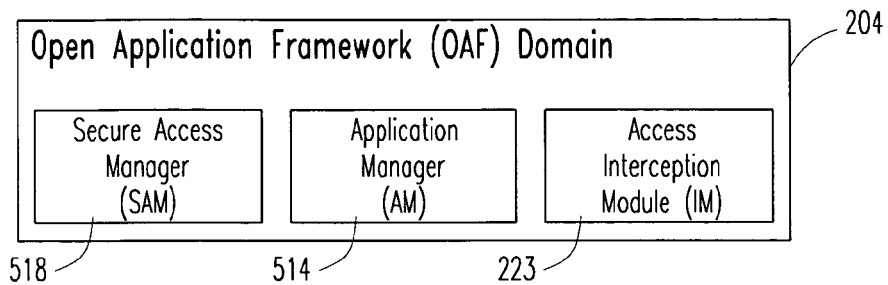
FIG. 5 is a block diagram that schematically illustrates details of the Open Application Framework API domain of the middleware services layer of FIG. 4 according to another exemplary embodiment of the present invention.

FIG. 5 is a block diagram that schematically illustrates major software modules in the Open Application Framework (OAF) API domain 204 according to an exemplary embodiment of the present invention. As shown, the modules include the SAM 518 and an access interception module (IM) 223. The SAM 518 is responsible for granting access by applications to the Open Platform API domain 206 made by non-native applications, such as Java applications, in order to monitor such applications according to their credentials. In other words, the SAM 518 has the responsibility to decide whether or not a call from a non-native environment should be permitted. The SAM 518 holds and maintains the security policies related to the access of the platform services. In this regard, access to the native platform services by the Java Exe Environment 504 may be more restrictive than for the native application environment 516. The IM 223 is responsible for monitoring service requests from the applications running in the non-native (e.g., Java) environment 504, monitoring that in some cases might also be considered for native execution environments.

In general, the AM 514 handles the registration, installation, start, stop, uninstall, and removal of all applications. The IM 223 intercepts non-native application service requests from the EXE environment to the native platform services (interception takes place at the border of the Java support layer in the case of a Java application) and calls on the SAM 518 to grant access. If access is granted, the non-native application service request is forwarded to the Open Platform API (OPA) 206 and treated the same as a native application. A permission request is traffic between the IM 223 and the SAM 518. A service request is traffic between an application 250 (See, e.g., FIGS. 6A–B), or any software in the application domain 500, and the platform domain 502. A service request represents a client accessing the services of the platform domain 502.

Figure 7:
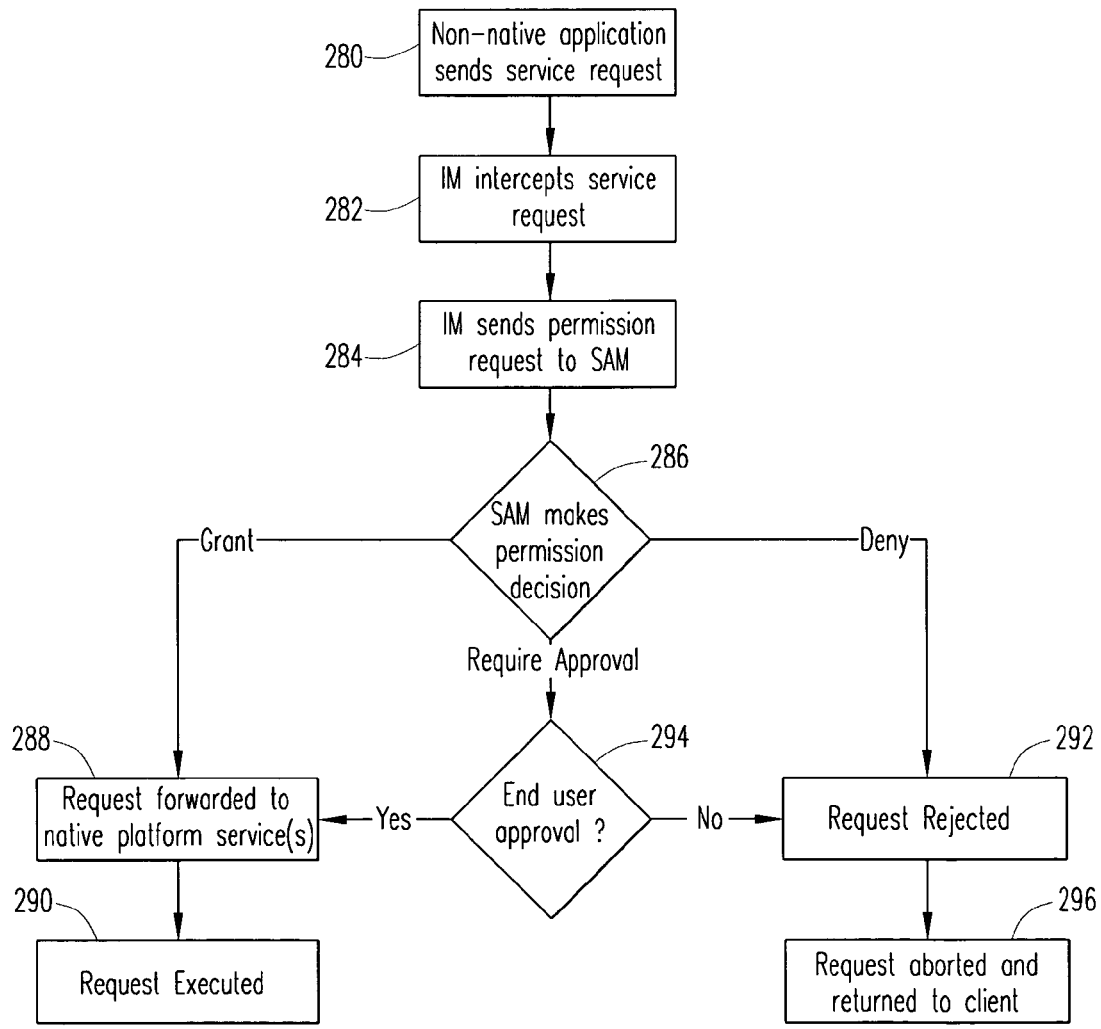
FIG. 7 is a flow chart that illustrates steps of a method for requesting access and receiving a permission decision from a SAM 518 in accordance with principles of the invention.
Figure 6A:
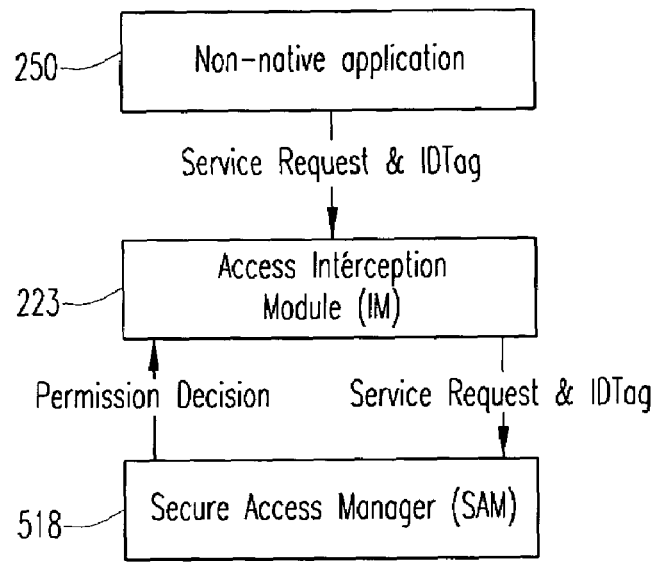
FIG. 6A is a block diagram that schematically illustrates details of the message relating to a permission request and decision in accordance with principles of the invention.

The SAM 518 may grant access to the native platform services in a variety of ways, one example of which is illustrated in FIGS. 6A and 7. In particular, FIG. 6A is a block diagram of the components and messages involved in granting or denying a service request, and FIG. 7 is a flow chart that illustrates a method associated therewith according to exemplary embodiments of the present invention.

With reference to FIGS. 6A and 7, a non-native application 250 requests a service that requires access to the native platform services at step 280. At step 282, the IM 223 intercepts the service request, which includes an ID tag of the requesting non-native application 250. At step 284, a permission request is sent from the IM 223 to the SAM 518 along with the ID tag included with the service request. The IM 223 may also send the SAM 518 additional access information and an identification of the native platform service that the non-native application 250 desires to access. The SAM 518 reviews the security policies of the native platform services to determine if access may be granted to the non-native application 250. At step 286, the SAM 518 forms a permission decision and forwards the decision to the IM 223. If the permission request is granted, then, at step 288, the service request is forwarded to the native platform service or services requested by the non-native application 250. The requested service is then executed at step 290. If the permission request is denied, then, at step 296, a reject response is sent to the non-native application 250.

Figure 8A:
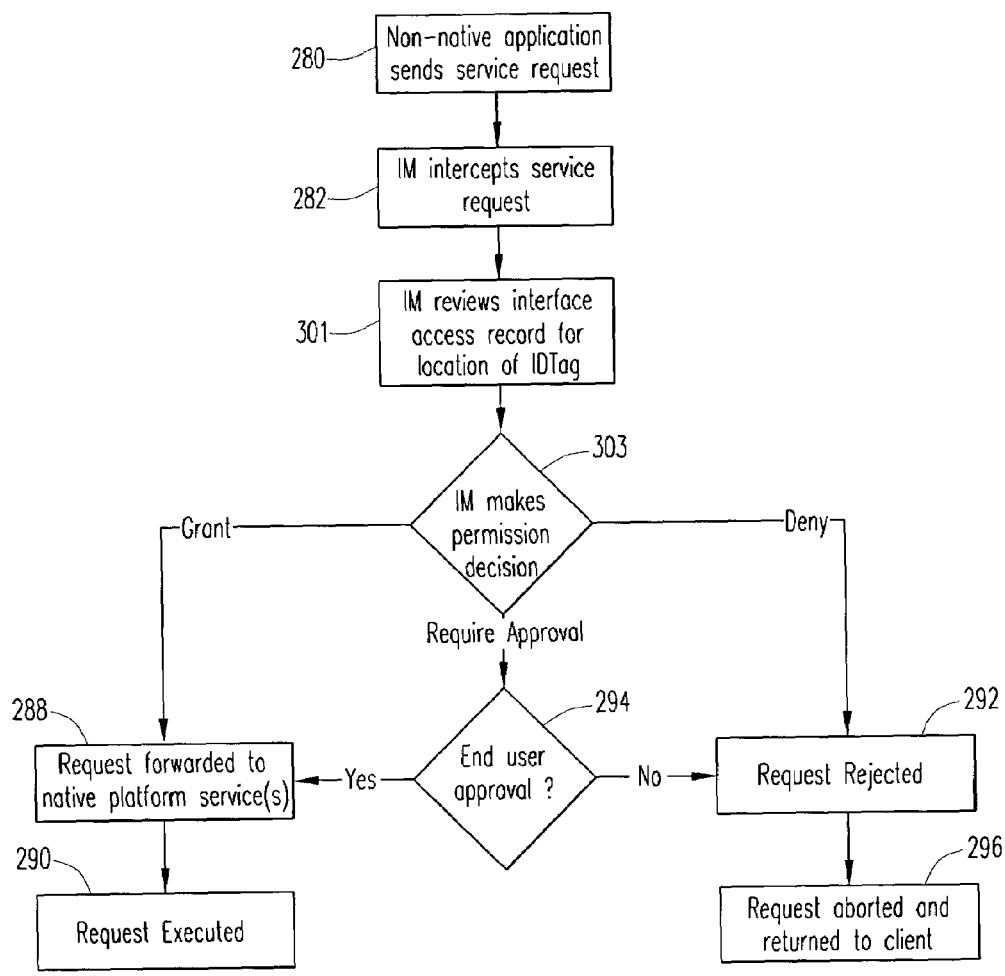
FIG. 8A and 8B is a flow chart that illustrates the steps of a method for requesting access and receiving a permission decision in a more efficient way according to another exemplary embodiment of the invention.

If the ID tag 320 does not match one of the ID tags 320 included in the located access record 318, the request is rejected at step 292 and the request is aborted and returned to the requesting non-native application 250 at step 296 as shown in FIGS. 7 and 8A.

In a further option, the permission decision may require an approval procedure. For example, the user may be asked to approve access to the native platform service as shown at step 294. If the user approves the access at step 294, then the request is forwarded to the native platform service as in step 288. However, if access is denied at step 294, then the request is rejected at step 292 and the request is aborted and returned to the client that issued the request at step 296.

Figure 6B:
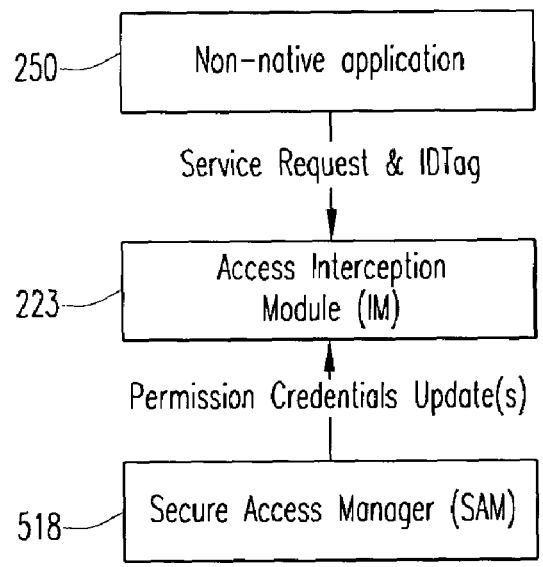
FIG. 6B is a block diagram that schematically illustrates details of the message relating to a permission request and a decision according to another exemplary embodiment of the invention.
Figure 8B:
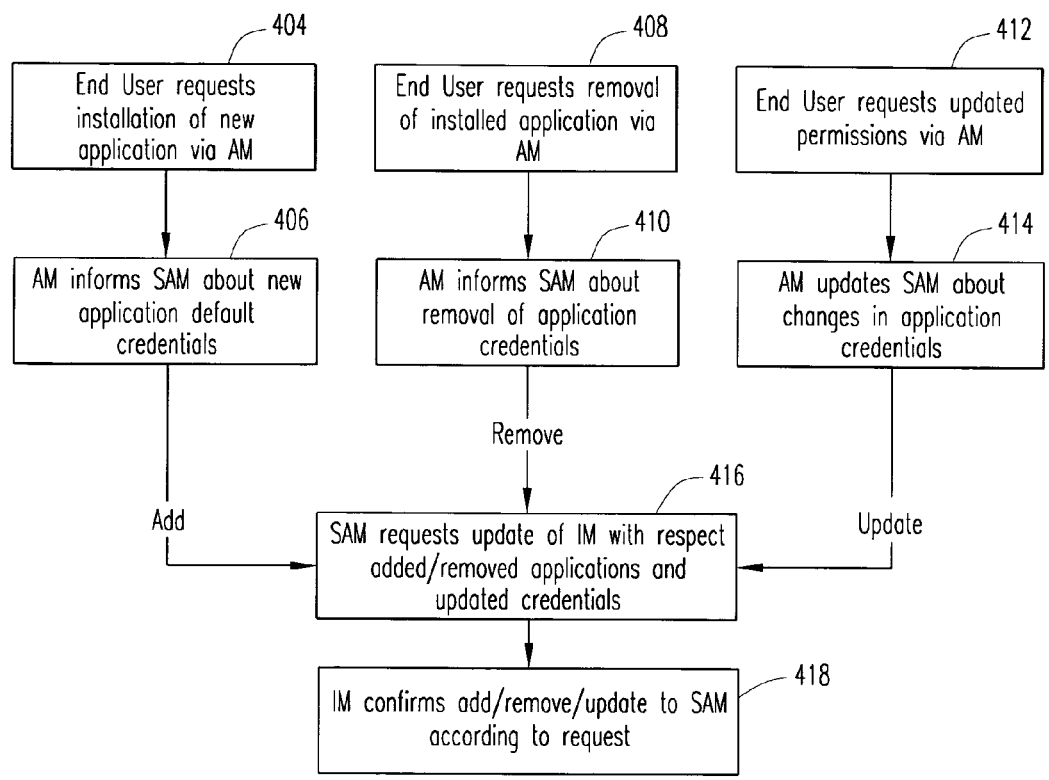

FIGS. 6B, 8A, and 8B illustrate another example where the interception module locally takes the decision to grant or deny requests and where the SAM 518 updates credentials stored in the IM. According to FIG. 6B, a non-native application 250 requests a service. The service request is intercepted by the IM 223. The IM 223 grants or denies the request locally. In parallel, the SAM 518 issues update requests to the IM 223, on a per need basis or at intervals, of the records kept by the IM 223 and upon which the IM 223 bases a grant.

FIG. 8A is a flow chart that further illustrates a process of granting or denying of a service request according to the example shown in FIG. 6B. As shown at steps 280 and 282, the non-native application 250 invokes a service request and the service request is intercepted, along with an ID tag, at the IM 223. Instead of sending a permission request with the ID tag from the IM 223 to the SAM 518, the IM 223 makes a decision locally. In this embodiment, the IM 223 maintains access records for the native platform services. Each access record includes the ID tags of specific applications that have permission to access the requested native platform service. At step 301, the IM 223 searches the access record of the requested native platform service to determine, at step 303, if the ID tag of the requesting non-native application 250 is associated therewith and the request should thus be granted. If the ID tag of the requesting non-native application 250 is found in the access record, then at step 303, permission is granted for the non-native application 250 to access the requested native platform service. Similarly to step 288 of FIG. 7, the service request is forwarded to the requested native platform service and the service is executed at step 290. If the ID tag of the requesting non-native application 250 is not found in the access record for the requested native platform service, the request is rejected at step 292, aborted and returned to the client that issued the request at step 296.

In a further option, the permission decision may require an approval procedure. For example, the user may be asked to approve access to the native platform service as shown at step 294. If the user approves the access at step 294, then the request is forwarded to the native platform service as in step 288. However, if access is denied at step 294, then the request is rejected at step 292 and the request is aborted and returned to the client that issued the request at step 296.

The SAM 518 may distribute permission update requests to at least one IM 223 as required or at predetermined intervals. As presented by FIG. 8B, there are different scenarios for when such an update might take place. The user may alter the permissions for a particular non-native application 250 during run-time via the AM 514, indicated by step 412, thereby requiring an update of the access records maintained by the SAM 518 as indicated by step 414. The updated permissions will then be forwarded by the SAM to the IM, as indicated by step 416. Additional cases where updates of the SAM and IM records are necessary include when a new application is added to the system, as indicated by steps 404 and 406, as well as when an existing application is removed from the system, indicated by steps 408 and 410. To further expedite the permission decision, a decision cache may be utilized in accordance with an embodiment of the IM 223 as described below.

Figure 9:
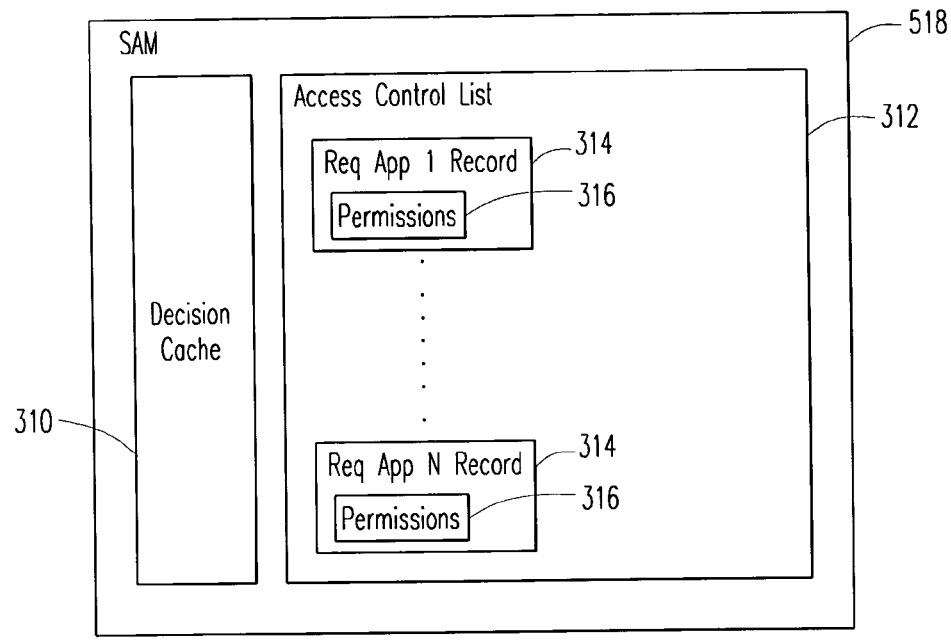
FIG. 9 is a block diagram illustrating details of the security access manager in accordance with principles of the invention.

Referring now to FIG. 9, details of the SAM 518 according to an exemplary embodiment of the present invention are illustrated. As shown, the SAM 518 includes a decision cache 310 for logging the most frequent and/or the most recent service requests to find the permission decision associated with a particular service request. A given non-native application 250 may submit the same service request numerous times. Therefore, the decision cache 310 keeps a record of frequent service requests and may search through the earlier requests to find the permission decision associated with the particular service request. For example, a Java application may request a particular native platform service a number of times. The received permission request includes the ID tag of the requesting non-native application 250.

The first time the non-native application 250 makes a service request, the SAM 518 accesses an Access Control List (ACL) 312 to determine if permission should be granted to the requested native platform service. The ACL 312 stores a number of access records, which are derived from, for example, application certificates of origin. These records 314 are associated with each registered and installed non-native application, such as a specific Java application. The SAM 518 searches through the possible records of requesting applications 314 to find a match with the particular requesting application. If the particular requesting application is found among the set of records, then the permissions 316 are searched to determine whether access should be granted to the requested native platform service. Based on the associated and stored permissions 316, a permission decision is generated. The permission decision is sent to the IM 223 and may also be logged, along with the permission request in the decision cache 310. The next time the service request from the same non-native application 250 is intercepted by the IM 223 and forwarded to the SAM 518, the decision cache 310 is searched for the permission request. When the permission request is located, the permission decision associated with the permission request is forwarded to the IM 223. By utilizing the decision cache 310, the SAM 518 becomes more efficient in making permission decisions.

Figure 10:
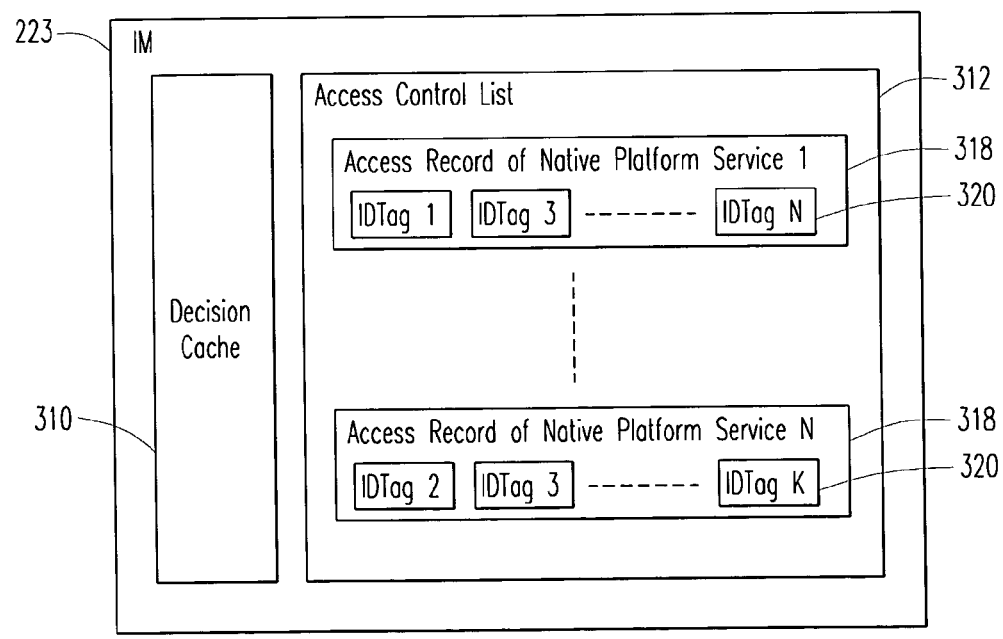
FIG. 10 is a block diagram illustrating details of the interception module according to another exemplary embodiment of the invention.

FIG. 10 illustrates details of IM 223 according to another exemplary embodiment of the present invention. Note that although the ACL and decision cache are located in the IM 223 in this example, the same principle is applicable if they were located in the SAM 518. In FIG. 10, ACL 312 stores access records of a different format from that illustrated in FIG. 9. In particular, in FIG. 10, ACL 312 stores access records 318 for the native platform services of the mobile terminal. An access record 318 exists for each native platform service (or group of services) of the mobile terminal. Each access record 318 includes the ID tags 320 of the non-native applications 250 that are allowed access to the particular native platform service (or group of services) associated with the access record 318. The SAM 518 sends requests to the IM 223 when updates to the access lists and records are needed. The update requests include the ID tag 320 of the non-native application 250 associated with the update and an identification of the requested native platform service or services where the permissions must be changed. The IM 223 searches the ACL 312 for the access record 318 of the requested native platform service. Once located, the IM 223 determines whether the ID tag 320 of the requesting non-native application 250 is included in the located access record 318. If the ID tag 320 of the requesting non-native application 250 matches one of the ID tags 320 included in the located access record 318, then permission is granted to the requesting non-native application 250 and the service request is forwarded to the native platform service handler. The permission decision may also be stored in the decision cache 310 in a manner similar to that described with reference to FIG. 9.

If the ID tag 320 does not match one of the ID tags 320 included in the located access record 318, the request is rejected at step 292 and the request is aborted and returned to the requesting non-native application 250 at step 296 as shown in FIGS. 7 and 8A.

On-demand as well as periodic permission update requests may be distributed from SAM 518 to a registered IM 223, even during run time. The user may update the permissions granted to a particular non-native application 250 and thereby cause outdated and incorrect information to exist in the SAM 518. Therefore, the SAM 518, whenever necessary or at periodic intervals, issues permission update requests to the IM 223 in order to update the access records 318 of the ACL 312 to maintain the correct permissions and/or ID tags. The ID tag 320 of a particular non-native application 250 may need to be added to or removed from certain access records 318 depending on the alterations made to the permissions of particular non-native applications 250 by the user.

To further simplify the permission decision procedure, types such as the ID tags 320, permissions 316, etc., may be grouped into categories to promote efficiency in the searching of the ACL 312 of the IM 223 (or the SAM 518 in case this module holds the ACLs). For instance, each native platform service may be assigned to a specific security category and each security category is associated with specific permissions. The permission decision is then based on the security category rather than an individual native platform service. Under normal circumstances, the number of security categories would be significantly lower than the number of native platform services and therefore search time related to determining the permission decision is reduced.

While what has been described constitute exemplary embodiments of the invention, it should be understood that the invention can be varied in many ways without departing from the scope thereof For example, although the present invention has been described primarily in connection with a platform for a mobile terminal for a wireless telecommunications system, the invention can also be used in connection with platforms for other products. Because the invention can be varied in many ways, it should be recognized that the invention should be limited only insofar as is required by the scope of the following claims.

We claim:

1. A system for controlling access to a platform, the system comprising:
    a platform having a software services component and an interface component, the interface component having at least one interface for providing access to the software services component for enabling application domain software to be installed, loaded, and run in the platform;
    an access controller for controlling access to the software services component by a requesting application domain software via the at least one interface, the access controller comprising:
    an interception module for receiving a request from the requesting application domain software to access the software services component;
    and a decision entity for determining if the request should be granted wherein the decision entity is a security access manager, the security access manager holding access and permission policies; and
    wherein the requesting application domain software is granted access to the software services component via the at least one interface if the request is granted.

2. The system according to claim 1, wherein:
    the request includes an identification of the requesting application domain software; and
    the security access manager includes a collection of records of approved requesting application domain software for use in determining if the request should be granted to the requesting application domain software based on the identification.

3. The system according to claim 2, wherein:
    the collection of records comprises an access control collection;
    the security access manager contains an associated permission collection; and
    the associated permission collection is used to determine if the request should be granted for a requesting application domain software included in the access control collection.

4. The system according to claim 1, wherein the security access manager comprises a decision cache for maintaining a record of requests by application domain software for determining if a permission decision has previously been granted to the requesting application domain software.

5. The system according to claim 1, wherein:
    the security access manager has a record of requesting application domain software; and
    the security access manager determines if the request should be granted based on an identification stored in the record.

6. The system according to claim 1, wherein, if the request is denied, a reject message is sent to the requesting application domain software by the interception module.

7. The system according to claim 1, wherein the application domain software comprises non-native application domain software.

8. The system according to claim 7, wherein the non-native application domain software comprises Java application software.

9. The system according to claim 1, wherein the platform comprises a platform for a mobile terminal for a wireless telecommunications system.

10. A system for controlling access to a platform for a mobile terminal for a wireless telecommunications system, the system comprising:
    a platform having a software services component and an interface component, the interface component having at least one interface for providing access to the software services component for enabling non-native application software to be installed, loaded, and run on the platform; and
    an access controller for controlling access to the software services component by the non-native application software via the at least one interface, the access controller including:
        an interception module for receiving a request from the non-native application software to access the software services component;
        and a decision entity for determining if the request should be granted; and
    wherein the non-native application software is granted access to the software services component via the at least one interface if the request is granted; and
    wherein the decision entity is a security access manager.

11. A system for controlling access to a platform, the system comprising:
    a platform having a software services component and an interface component, the interface component having at least one interface for providing access to the software services component for enabling application domain software to be installed, loaded, and run in the platform; and
    an access controller for controlling access to the software services component by a requesting application domain software via the at least one interface, the access controller comprising:
    an interception module for receiving a request from the requesting application domain software to access the software services component;
    a decision entity for determining if the request should be granted;
    wherein such interception module includes a cache with the rules and policies of the decision entity; and
    wherein the requesting application domain software is granted access to the software services component via the at least one interface if the request is granted.

12. The system of claim 11, wherein the decision entity is a security access manager adapted to hold access and permission policies.

13. The system of claim 11, wherein the cache in the interception module is adapted to increase the speed of the decision making procedure.

14. The system of claim 13, wherein the interception module is adapted to receive updates when changes are made to the rules and policies in the decision entity.

15. The system of claim 14, wherein the interception module is adapted to query the decision entity whether any changes have been made to the rules and policies in the decision entity.

16. The system of claim 15, wherein each such query is undertaken at every request, at start-up or at certain intervals.

17. The system of claim 14, wherein the decision entity is adapted to contact the interception module when an update to the cache in the interception entity is necessary.

* * * * *